Patented Oct. 20, 1931

1,828,560

UNITED STATES PATENT OFFICE

WILLEM CORNELIS DE LIEFDE, OF AMSTERDAM, NETHERLANDS, ASSIGNOR TO NAAM-LOOZE VENNOOTSCHAP: ELECTRO ZUURSTOFEN WATERSTOFFABRIEK, OF AMSTERDAM, NETHERLANDS

POLYMERIZATION PRODUCT OF ACETYLENE AND PROCESS OF PRODUCING THE SAME

No Drawing. Application filed January 4, 1929, Serial No. 330,411, and in the Netherlands January 9, 1928.

When acetylene is passed over metals or metallic compounds such as copper, nickel, iron or oxydes of the said metals at a high temperature a polymerization or condensation of the acetylene occurs, giving rise to a very voluminous yellowish-brown mass which is called cuprene or carbene. Very little is known concerning the mechanism of this reaction; formerly it was thought that the product formed in the presence of copper was a copper compound; afterwards it was however found that the copper could be completely eliminated by boiling with acid and that the substance which is formed probably consists of one or more hydrocarbons of high molecular weight.

I have found that products with materially different properties can be prepared when the cuprene is formed in the presence of small quantities of magnesium. The most important property of the products obtained in this way is the high adsorptive power for dyestuffs, smelling substances and generally for all those substances which can be adsorbed by adsorption means. Cuprene which is prepared in the usual way possesses the said property only in a very small degree.

Moreover the magnesium has a strong accelerating influence on the production of cuprene and generally is a very active auxiliary catalyzer for the preparation of cuprene.

Magnesium can be used in the first place as an activator for the known catalyzers like copper, nickel etc. To this end a small quantity of magnesium powder (e. g. about 1%) is added to the copper- or nickel powder serving as catalyzer. In passing acetylene over the catalyzer in the usual way at temperatures of 200–400° C. a product is formed which looks quite differently from the ordinary cuprene, e. g. the product which has been obtained in the presence of copper alone, and has a much darker colour. The velocity of the reaction is much increased by the addition of magnesium and, departing from a certain quantity of copper powder, the reaction can be continued much further, so that the yield of cuprene calculated on the amount of copper applied is materially increased.

The product obtained in this way is an excellent adsorption means and can be successfully used whenever animal or vegetable charcoal is used as adsorption means. An explanation of the special properties of the new substance cannot be given; the appearance of the product rather gives the impression as if it contained free carbon, the presence of the same being possible as a result of the decomposition of the magnesium carbide which can be formed by the reaction between acetylene and magnesium, and it is not at all improbable that a certain connection between the presence of free carbon and the adsorptive power of the product should exist.

The adsorptive power of the substances obtained in the above described way can be shown by the following tests:

When 100 c. c of the ordinary blue methylated spirit is shaken with 10 grams of the cuprene obtained according to the invention the liquid is completely decolourized in some minutes.

When dirty water is passed through a layer of the cuprene of about 10 mm. a completely clean water results.

It is however not only possible to use magnesium as an activator for metals or metallic compounds, it has also the curious property to be able to act as an activator for the cuprene itself; consequently the magnesium is capable of bringing about the formation of cuprene when acetylene is passed over cuprene which does not contain any metal other than said magnesium.

A cuprene which is wholly free from metals can be prepared in the following way: A series of preparations of cuprene are executed, thereby using the reaction product of the previous stage as a catalyzer for the next stage. The quantity of metal in the subsequent reaction products decreases very quickly. Departing from 1 gram of copper $n$ grams of cuprene are obtained in the first stage of the preparing process. 1 gram of this cuprene is used for the next stage so that now $n$ grams of cuprene are obtained containing only $$\frac{1}{n}$$

gram of copper so that the copper content of the mass amounts to $$\frac{1}{n_2}$$

g. per g. of cuprene. In the same way this product is used as catalyzer for the third and subsequent preparations etc. After, for example, ten preparations the product will only contain $n^{-10}$ copper per gram. The product of the third stage is already practically free from copper so that it is impossible to trace this metal by adding calciumferrocyanide to the solution obtained by boiling the cuprene with hydrochloric acid during 24 hours.

When a small quantity of magnesium (less than 1%) is added to the above described cuprene, which is wholly free from copper it is found that a considerable amount of cuprene is formed when passing acetylene over the same in the usual way at temperatures of 200–400° C. This reaction is very remarkable because magnesium as such does not act as a catalyzer for the forming of cuprene; when passing acetylene over heated magnesium powder some reaction occurs and traces of magnesium carbide are produced under development of hydrogen and formation of small quantities of tar-like substances but no cuprene is found in the reaction product. When, however, same magnesium powder is added to a previously prepared cuprene and acetylene is passed over the same it is found that a ready formation of cuprene occurs even when the used cuprene does not contain a trace of copper.

The cuprene obtained in this way has the same properties as the product formed in the presence of copper activated with magnesium; it has the same dark colour and shows an excellent adsorptive power.

The cuprene obtained in one of the above described ways still contains a small amount of magnesium and can generally be used for technical purposes without further treatment. The magnesium can however easily be eliminated by boiling the product with acid if this should be desirable for a certain purpose.

I claim:

1. A process of manufacturing products with highly adsorptive properties from acetylene which comprises passing acetylene over cuprene to which a small amount of magnesium has been added, the said cuprene being at a temperature between 200 and 400° C.

2. A process for manufacturing products with high adsorptive properties from acetylene, consisting in passing the acetylene over a catalyst from the group containing copper, nickel, iron and their oxides, to which substance a small amount of magnesium has been added, the said catalyst having a temperature between 200 and 400° C.

3. As a new article of manufacture, a highly adsorptive body comprising the reaction product obtained by passing acetylene over cuprene containing a small amount of magnesium, the said cuprene being heated to a temperature between 200 and 400° C.

4. As a new article of manufacture, a highly adsorptive body comprising the reaction product obtained by passing acetylene over a catalyst selected from the group consisting of copper, nickel, iron and their oxides, to which magnesium has been added, the said catalyst being at a temperature between 200 and 400° C.

In testimony whereof I affix my signature.

Dr. WILLEM CORNELIS de LIEFDE.